United States Patent [19]

Bates

[11] 3,928,812

[45] Dec. 23, 1975

[54] PROGRAMMABLE BIT CLOCK OSCILLATOR FOR CONTROLLING THE PROCESSING OF BINARY DIGITS

[75] Inventor: Roger D. Bates, Sunnydale, Calif.

[73] Assignee: Xerox Corporation, Stamford, Conn.

[22] Filed: Nov. 23, 1973

[21] Appl. No.: 418,507

[52] U.S. Cl. .................... 331/1 A; 331/10; 331/25; 331/36 C; 331/108 D; 331/143; 331/177 V

[51] Int. Cl. .................... H03b 3/04

[58] Field of Search .............. 331/18, 25, 36 C, 1 A, 331/10, 143, 177 V, 108 D; 178/6.8, 7.5 D, 7.7

[56] References Cited

UNITED STATES PATENTS

| | | | |
|---|---|---|---|
| 3,337,814 | 8/1967 | Brase et al. | 331/18 |
| 3,375,461 | 3/1968 | Ribour et al. | 331/18 X |
| 3,775,695 | 11/1973 | Hill | 331/25 X |
| 3,824,494 | 7/1974 | Wilcox | 331/34 X |

*Primary Examiner*—Siegfried H. Grimm
*Attorney, Agent, or Firm*—James J. Ralabate; Terry J. Anderson; John H. Chapman

[57] ABSTRACT

An oscillator is provided to control the processing of binary digits. If such bits comprise video information which construct characters on a display monitor, then by varying the frequency of the oscillator the number of bits or pulses during visible portions of the scan time is controlled. The oscillator includes a register, counter, comparator logic, and speed correction circuitry. The oscillator itself has a disable input which in combination with the other elements provides an output signal that may also be started or stopped synchronously.

8 Claims, 6 Drawing Figures

PROGRAMMABLE BIT CLOCK OSCILLATOR FOR CONTROLLING THE PROCESSING OF BINARY DIGITS

BACKGROUND OF THE INVENTION

This invention relates in general to oscillators and more particularly to programmable oscillators.

The display of video information on any scan line display monitor, for example a T.V. scan display, is achieved through the use of high-speed oscillators used to control the output of individual bits which make up the characters to be displayed. The speed of the oscillator effects the width of the characters as well as the number of characters per line on the display. In state-of-the-art systems, the speed of this oscillator is fixed, based on a predetermined character width and a desired number of characters per line.

It is an object of the present invention to provide an oscillator which allows for full flexibility in the choice of oscillator speeds which in turn would allow a choice of character width and the number of characters per line.

It is a further object of the present invention to provide a programmable oscillator which controls the number of character pulses during the scan time.

It is yet another object of the present invention to provide a programmable oscillator which allows the conversion of large characters to small characters.

It is another object of the present invention to provide a programmable oscillator which allows the use of multiple fonts for display.

It is still another object of the invention to provide a programmable oscillator which can be started or stopped synchronously.

Other objects of the invention will be evident from the description hereinafter presented.

SUMMARY OF THE INVENTION

The invention provides an oscillator for controlling character information for display on a scan line device. The oscillator is programmable such that its speed may be varied to effect the width of the characters and the number of characters to be displayed per line as desired. The basic form of the oscillator is essentially an R-C circuit wherein the capacitance is furnished by a Varacter diode. The oscillator has a disable input which controls the oscillator such that the oscillator is able to commence each scan line with the same phase.

Another feature of the invention is that the oscillator is responsive to a register which is loaded under program control for holding a binary number indicating the number of bits per scan line desired.

Still another feature of the invention is the use of comparator logic which generates pulses indicating whether the oscillator is operating too fast or too slow in relation to generating the correct number of character bits per scan line.

Yet another feature of the invention is a correction circuit responsive to the output of the comparator to generate incremental correction signals every scan line to control the speed of the oscillator.

These and other features which are considered to be characteristic of this invention are set forth with particularity in the appended claims. The invention itself, however, as well as additional objects and advantages thereof will best be understood from the following description when considered in conjunction with the accompanying drawings.

DESCRIPTION OF THE PREFERRED EMBODIMENT

Figure 1:
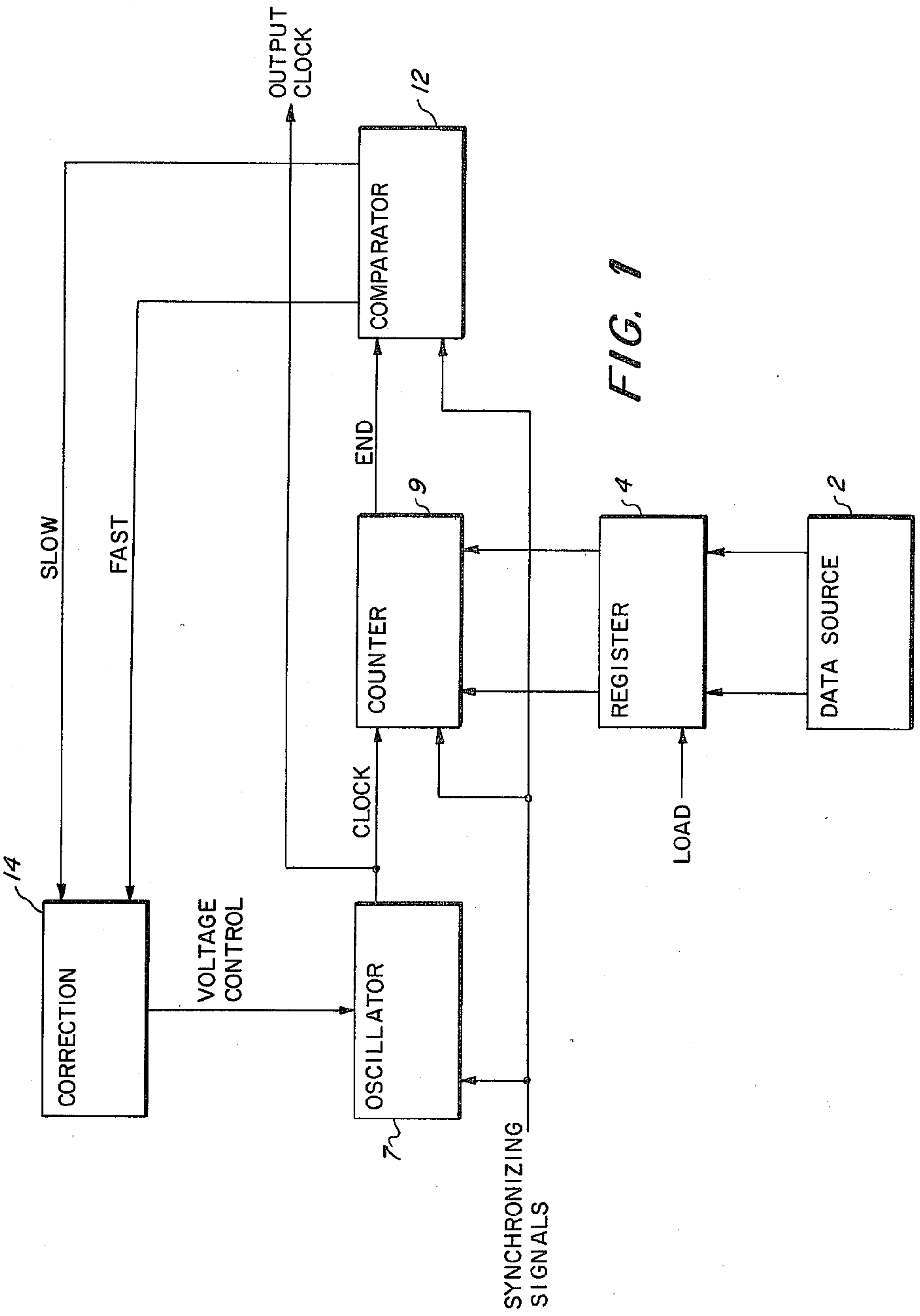
FIG. 1 is a functional block diagram illustrating the basic elements of the invention.

As shown in FIG. 1, data from a data source 2 is loaded into a register 4 upon the instance of a load signal generated by program control. The register 4 thereby holds a binary number which is to determine the speed which an oscillator 7 is to operate. If the clock output of the oscillator 7 is to constitute individual bits which would construct characters for display on a scan line device, then the number held in the register 4 would indicate the number of bits per scan line desired. A counter 9 is loaded at the start of a scan line with the contents of the register 4 and counts down to zero in response to certain synchronizing signals. When it reaches zero, the counter 9 generates an END signal which, if the oscillator 7 is at the desired speed, coincides with the end of a scan line. A comparator 12 is responsive to the END signal and the horizontal blanking synchronizing signal from the scan line device to compare them for generating pulses indicating whether the oscillator 7 is operating too fast or too slow. The output pulses from the comparator 12 are received by a correction circuit 14 whose output controls the speed of the oscillator 7 to synchronize the operation. The oscillator 7 also has as a synchronizing input a disable signal which stops the oscillator such that the oscillator 7 always starts the scan line with the same phase. Therefore, an output clock is provided which has the desired number of bits per scan line.

Figure 2:
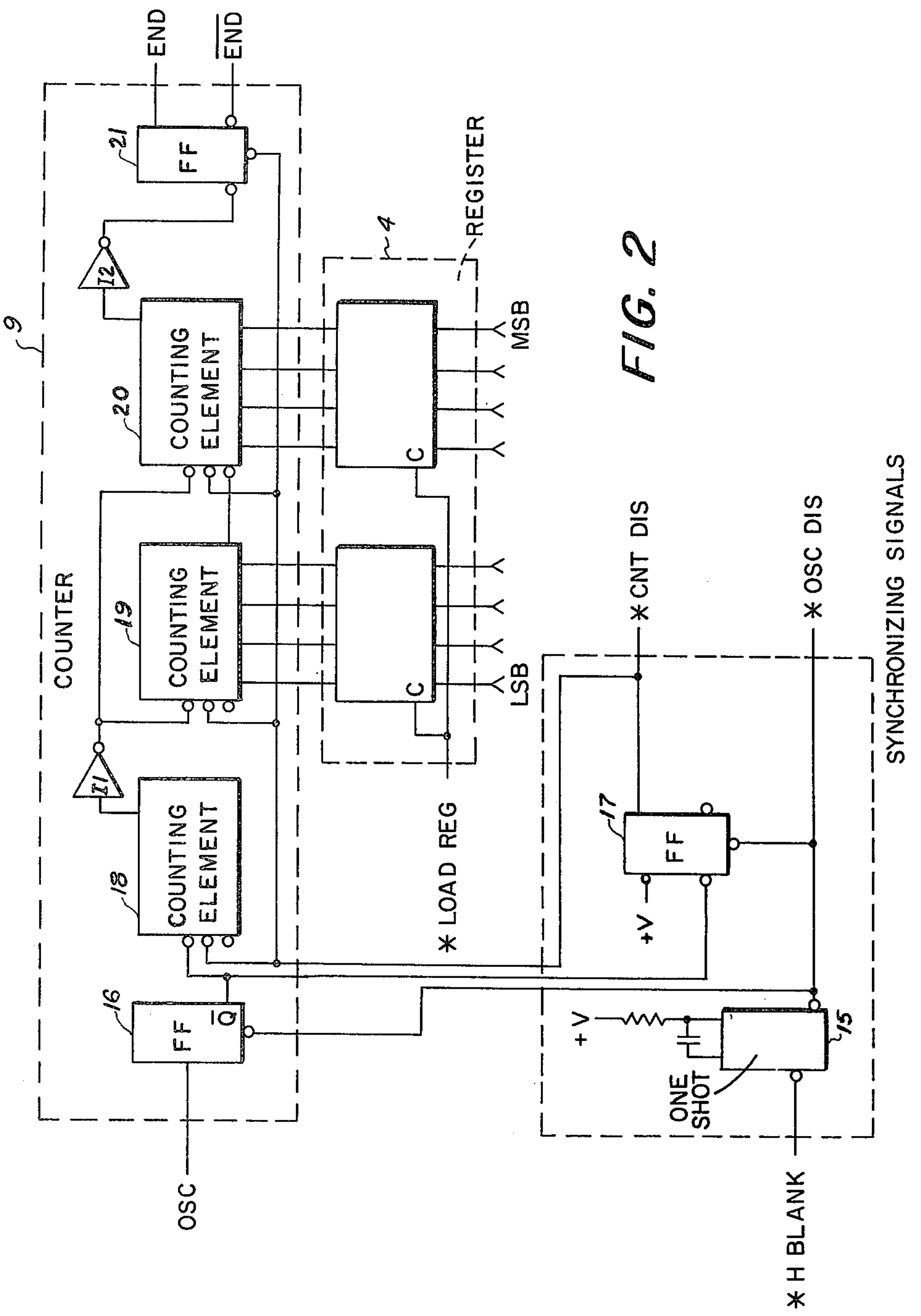
FIG. 2 is a schematic diagram of certain of the elements shown in FIG. 1.

Certain of the synchronizing signals are generated as shown in FIG. 2. A horizontal blank signal H BLNK is associated with the operation of any scan line device. *H BLNK is obtained by merely inverting H BLNK through an inverter (not shown). *H BLNK triggers a one-shot timing element 15 which gives a short pulse at the end of *H BLNK to provide the disable input signal *OSC DIS which is used to stop the oscillator 7. The output OSC of the oscillator 7 serves as a clock input to the counter 9. The OSC signal enables a flip-flop 16 whose output at $\overline{Q}$ serves as a clock signal which runs at one-half the speed of OSC. The clock signal from $\overline{Q}$ enables a D-type flip-flop 17 to generate the other synchronizing signal *CNT DIS. The flip-flop 17 is re-set at the beginning of *OSC DIS and thereby activates *CNT DIS signal. The *CNT DIS signal remains in a low state until after the first clock pulse when the oscillator 7 is restarted. The result is to cause the number held in the register 4 to be loaded into the counter 9 on the first clock pulse with the oscillator 7 restarted.

The clock signal generated by the flip-flop 16 further serves as a clock input to a four-bit counting element 18 which is loaded by *CNT DIS. The output from the element 18 is inverted by an inverter I1 to serve as a clock input to four-bit counting elements 19 and 20 which are also loaded by *CNT DIS. The contents of the register 4 from the most significant bit MSB to the least significant bit LSB is thus parallel loaded into the counting elements 19 and 20 of the counter 9.

The carry output of the element 19 is connected to the counter enable input of the element 20 to transfer an internally generated signal within the element 19 which indicates that all four outputs of the element 19 are ONE's. Under this condition, the element 20 is enabled to count on the next clock pulse. The output of the element 20 is inverted by the inverter I2 to enable a flip-flop 21 to generate the respective counter output signals END and $\overline{\text{END}}$. The flip-flop 21 is reset by *CNT DIS. The counting elements 18, 19, and 20 in this preferred embodiment are 74161 TI modules and, as connected in FIG. 2, perform as a twelve-bit binary counter.

Figure 3:
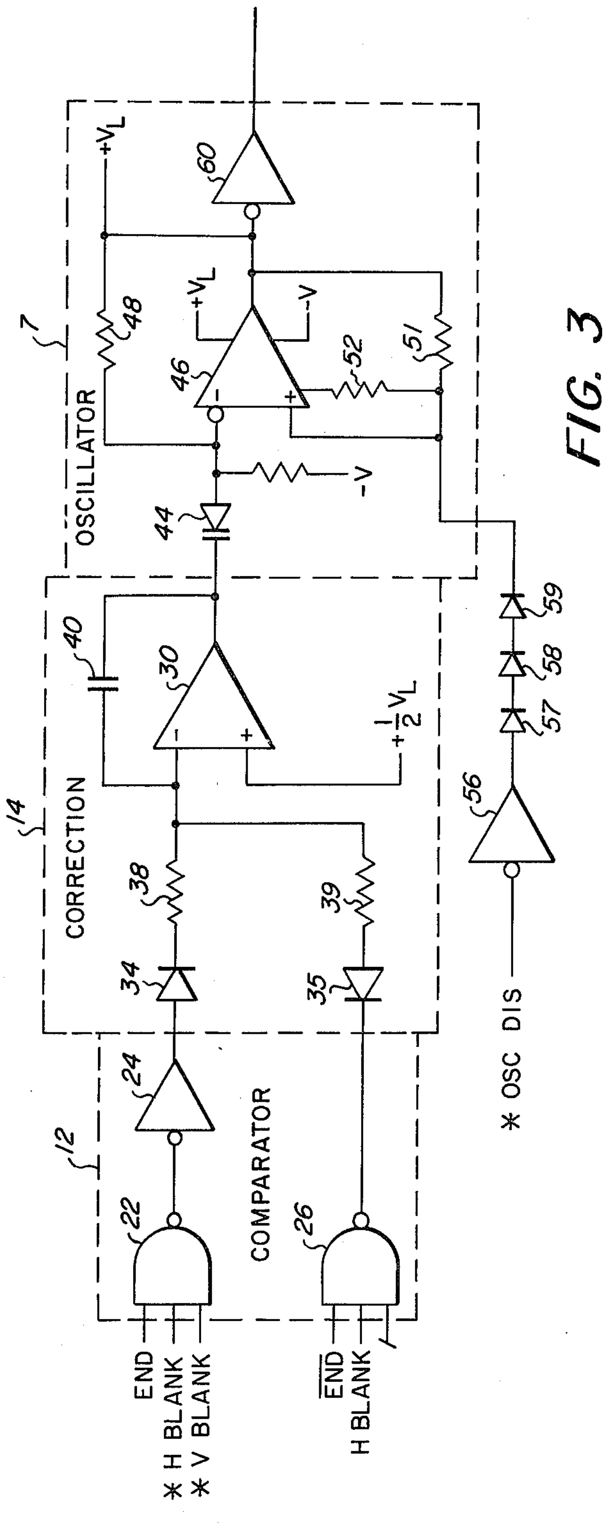
FIG. 3 is a schematic diagram of certain other elements shown in FIG. 1.

The signals END, and *H BLNK are gated through a NAND gate 22 and inverted by inverter 24, which comprise a portion of the comparator 12 shown in FIG. 3. Alternatively, an AND gate could serve the same function as do the NAND gate 22 and the inverter 24.

In cathode ray tube (CRT) applications, an additional synchronizing signal is necessary, namely, *V BLNK. Such a synchronizing signal would be derived be inverting the vertical blanking synchronizing signal to provide an additional parallel input to the NAND gate 22. The *V BLNK signal would serve to disable the correction circuit 14 during vertical retrace time in such applications to avoid a slowdown in frequency due to the omission of horizontal blank pulses during the vertical blanking signals.

The remaining portion of the comparator 12 is a NAND gate 26 which gates the inputs $\overline{\text{END}}$ and H BLNK. Correction pulses for the oscillator 7 are produced in accordance with the state of these inputs to the comparator 12.

If the oscillator 7 is running too fast, a correction pulse would be generated having the form of a positive spike generated when the signal END appears on the input and *H BLNK has not yet appeared. This condition is indicative of the counter 9 running too fast. It is assumed that the *V BLNK signal is not present for this explanation. For the period that END is generated and *H BLNK is not, a positive correction pulse is generated which has the effect of slowing down the oscillator 7. Similarly, a negative correction pulse is generated at the output of the comparator 12 by the NAND gate 26 if the oscillator 7 is running too slow. The output of the comparator 12 is connected to the negative terminal of an operational amplifier which forms the basis of the correction circuit 14.

The inputs to the correcting circuit 14 are respectively directed through diodes 34 and 35 and resistors 38 and 39. The purpose of each diode and resistor is seen by discussing, for example, the situation of the positive correction pulse. When the level of the output of the inverter 24 is a ground, the diode 34 is back biased, and no current passes through the resistor 38 into or out of the negative input to the amplifier 30. When the diode 34 is forward conductive, the current then flows through the resistor into the negative input of the amplifier 30.

A feedback capacitor 40 is connected in parallel with the amplifier 30 to provide an integrated output which is applied to a voltage controlled diode 44 at the input to the oscillator 7. The voltage controlled diode 44 acts as a capacitor element to the oscillator 7. The base of the diode 44 is connected to the negative input of a comparator 46 within the oscillator circuit. The capacitance of the diode 44 has the characteristic that it varies as a function of the back biased voltage and therefore affects the frequency of the oscillator circuit comprising the comparator 46 and the remaining associated circuit elements. The output of the comparator 46 is either at ground or a positive potential, depending upon the difference in potential between its negative and positive inputs.

The output from the comparator 46 is fed back through a resistor 48 to the negative input, thus providing an oscillating signal at the output of the comparator 46. The output voltage is also fed back through a resistor 51 and a resistor 52 divider network to provide a small portion of positive feedback to implement hysteresis to the oscillator 7. This feedback component allows for a more stable operation for the oscillator 7. An additional input to the oscillator 7 is derived from the signal *OSC DIS.

As is shown in FIG. 3, *OSC DIS is inverted through an inverter 56 to provide a disable signal OSC DISABLE for the oscillator 7. This disable signal is passed through three diodes 57–59 in series to the positive input of the comparator 46. When OSC DISABLE is high, it pulls the positive input of the comparator 46 to a high enough voltage so that the oscillator circuit can no longer oscillate, thus stopping it. When OSC DISABLE goes back to a ground potential, the positive input of the comparator 46 is allowed to go to its normal level and oscillation will start resynchronized with the end of the oscillator disable signal. The oscillating output from the comparator 46 is passed through an inverter 60 to provide the ouput signal OSC. Thus, a servo-controlled bit clock is provided which may be started or stopped synchronously.

The OSC output signal serves as a clock input to the counter 9, as was previously described. The output END of the counter 9 is indicative of the counter 9 counting the required number of clock pulses to start the signal END and is turned off by the occurrence of *COUNT DISABLE which occurs at the end of the H BLNK signal. The shape of the signal END then takes a form identical to that of H BLNK, provided that the clock is running at the required frequency. If the oscillator 7 is running off frequency, then the signal END will either be too long or too short.

At the beginning of a counting sequence, the signal *COUNT DISABLE is used to load the counter 9 with the value which is stored in the register 4. When loaded, the counter 9 then starts counting down based on its clock input from the oscillator 7. In this way a value is entered from the data source 1 which represents the number of oscillator cycles which are to occur during the H BLNK period. Thus, the output clock provided by the invention may be used in various applications requiring synchronous control. For example, the output clock may be utilized in a CRT display system in which it is desirable to control the number of bits or dots per scan line.

Figure 4:
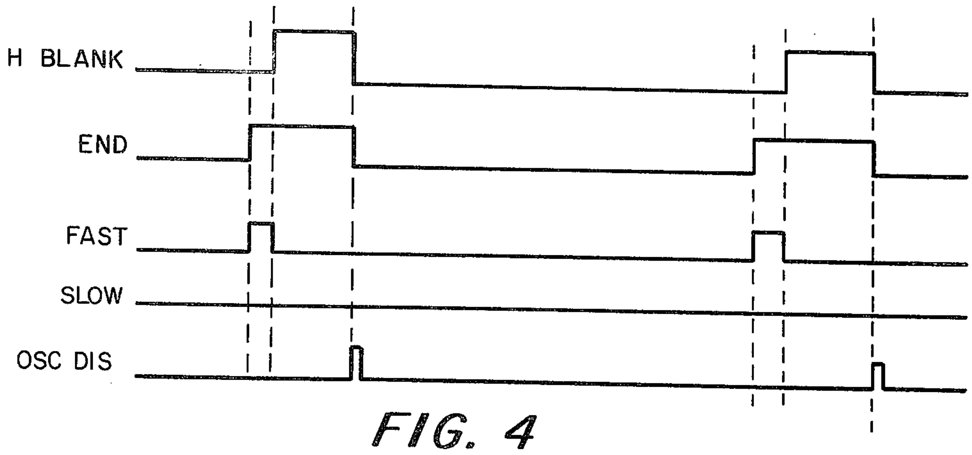
FIG. 4 is a timing diagram for a fast operation of the oscillator shown in FIG. 1.

In FIG. 4 is shown a timing diagram which indicates the situation of the oscillator 7 running too fast. In this situation the signal END is seen to start before the signal H BLNK. The correction signal generated by the NAND gate 26 starts at the leading edge of END and finishes at the leading edge of H BLNK. This signal is fed to the integrator 30 to change its voltage such that the oscillator 7 will be slowed down.

Figure 5:
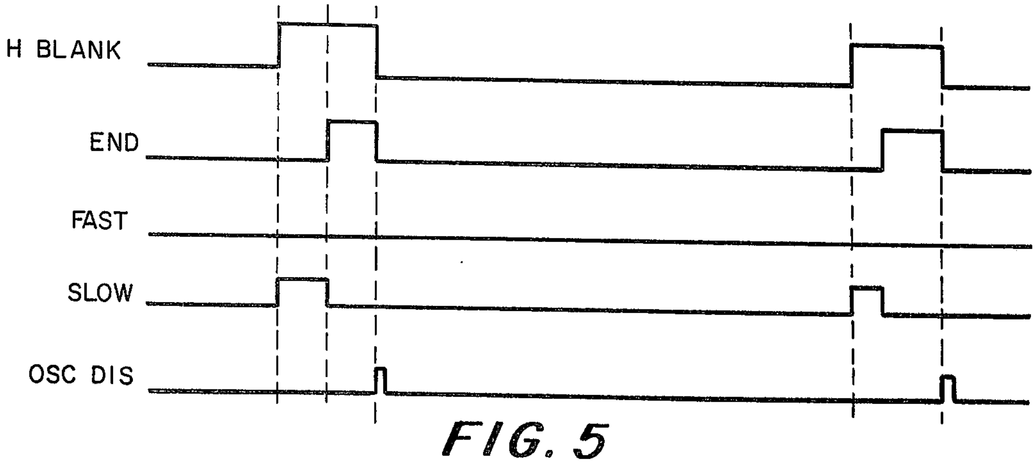
FIG. 5 is a timing diagram for the slow operation of the oscillator shown in FIG. 1.

In FIG. 5 is shown the situation of the oscillator 7 running too slowly. In this case the signal END is a pulse starting later than the reference signal H BLNK. The slowdown correction pulse generated by the NAND gate 22 and inverted by the inverter 24 starts at the leading edge of the signal H BLNK and terminates at the leading edge of the signal END. This correction signal is fed to the integrator 30 to change its voltage such that the oscillator 7 will be sped up. The correction voltages are thereby seen as small increases or decreases in voltage output from the integrator 30. For example, in the case of the oscillator 7 running too slowly, the output voltage of the integrator 30 will have a small increment of voltage. During the next scan line, the oscillator 7 will run somewhat faster than before but not immediately to the desired speed. This process will continue with each scan line until the oscillator 7 has reached the desired speed. Since the output voltage of the integrator 30 discharges slowly with no input correction signals, the stable state will be reached when a small correction voltage is received on every scan line to compensate for this decay.

Figure 6:
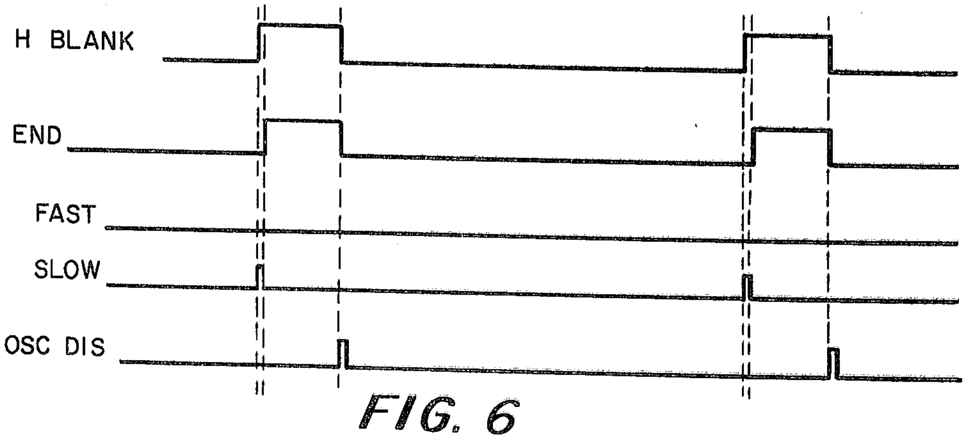
FIG. 6 is a timing diagram for the synchronized operation of the oscillator shown in FIG. 1.

FIG. 6 represents the case of the oscillator 7 being synchronized with the desired speed of operation. It is evident in this case that the reference signal HORIZONTAL BLANK and the timing signal END are essentially identical signals. In an ideal situation, the HORIZONTAL BLANK and END BLANK signals will be identical with no correction signals being generated to either speed up or slow down the oscillator 7.

Obviously, many modifications of the present invention are possible in light of the above teaching. It is therefore to be understood that, in the scope of the appended claims, the invention may be practiced other than as specifically described.

What is claimed is:

1. A programmable oscillator for controlling the processing of binary digits, comprising:

oscillator means for providing an output clock signal indicative of the operating speed of said oscillator means, counter means for receiving binary data indicative of the desired operating speed of said oscillator means, said counter means being responsive both to the output clock signal from said oscillator means and to synchronizing signals which control the countdown of said counter means from the binary data value for providing an output signal, comparator means for comparing the output of said counter means with synchronizing signals, correction means responsive to the output of said comparator means for generating incremental correction signals which control the operating speed of said oscillator means, and timing means responsive to one of said synchronizing signals for generating a disabling signal which further controls said oscillator means such that said oscillator means commences predetermined bit streams with the same phase.

2. The oscillator as defined in claim 1 in which said oscillator means comprises a second comparator means and a voltage controlled diode whose anode is connected to the inverting input terminal of said second comparator means, the noninverting input of said second comparator means being connected to a reference potential, and in which said incremental correction signals are applied through said diode to the inverting input of said second comparator means.

3. The oscillator as defined in claim 2 in which the output voltage of said second comparator means is fed back through a load to the inverting input for providing an oscillating signal at the output of said second comparator means and fed back through a load divider means to the noninverting input terminal to implement hysteresis to said oscillator means.

4. The oscillator as defined in claim 3 in which said disabling signal is applied as well to the noninverting input terminal of said second comparator means for synchronously starting and stopping the output clock signal of said oscillator means.

5. A programmable oscillator for controlling the processing of binary digits for display on a scan line device, comprising:

oscillator means for providing an output clock signal for synchronous control of a bit stream which is used to construct characters for display on said device, counter means for receiving binary bits indicative of the number of bits per scan line desired, said counter means being responsive both to the output clock signal from said oscillator means and to synchronizing signals which control the countdown of said counter means from the value of the binary bits for providing an output signal, comparator means for comparing the output of said counter means with synchronizing signals, correction means responsive to the output of said comparator means for generating incremental correction signals every scan line to control the speed of said oscillator means whereby the number of bits per scan line is controlled, and timing means responsive to one of said synchronizing signals for generating a disabling signal which further controls said oscillator means such that said oscillator means commences each scan line with the same phase.

6. The oscillator as defined in claim 5 in which said oscillator means comprises a second comparator means and a voltage controlled diode whose anode is connected to the inverting input terminal of said second comparator means, the noninverting input of said second comparator means being connected to a reference potential, and in which said incremental correction signals are applied through said diode to the inverting input of said second comparator means.

7. The oscillator as defined in claim 6 in which the output voltage of said second comparator means is fed back through a load to the inverting input for providing an oscillating signal at the output of said second comparator means and fed back through a load divider means to the noninverting input terminal to implement hysteresis to said oscillator means.

8. The oscillator as defined in claim 7 in which said disabling signal is applied as well to the noninverting input terminal of said second comparator means for synchronously starting and stopping the output clock signal of said oscillator means.

* * * * *